United States Patent [19]

Carlsen

[11] 4,295,162

[45] Oct. 13, 1981

[54] READING ONE-DIMENSIONAL LINE IMAGE HOLOGRAMS OF A VIDEO FROM A DISC WITH A GUIDE TRACK

[75] Inventor: W. John Carlsen, Natick, Mass.

[73] Assignee: GTE Laboratories Incorporated, Waltham, Mass.

[21] Appl. No.: 612,381

[22] Filed: Sep. 11, 1975

[51] Int. Cl.³ .................... H04N 5/86; G11B 7/12; G11B 17/02

[52] U.S. Cl. .................... 358/128.6; 369/50; 369/103; 369/111; 369/121; 369/275; 369/279

[58] Field of Search ............. 178/6.7 A, 6.7 R, 6.6 R, 178/6.6 DD, 6.6 B; 179/100.3 V, 100.3 G, 100.3 R, 100.3 B, 100.1 G; 350/3.5; 340/173 LT, 173 LM; 274/41.6 R; 358/128, 129, 130, 132, 128.5, 128.6, 131, 127

[56] References Cited

U.S. PATENT DOCUMENTS

4,021,606 5/1977 Takeda et al. .................... 358/130
4,025,731 5/1977 Rembault .................... 350/3.5

*Primary Examiner*—Raymond F. Cardillo, Jr.
*Attorney, Agent, or Firm*—Fred Fisher

[57] ABSTRACT

A holographic video disc system is described in which the baseband information for successive horizontal television line intervals is recorded as successive holograms of one-dimensional line images in a spiral track on the surface of a disc of material. A spiral guiding track is also formed in the surface of the disc immediately adjacent to the spiral track of holograms. The recording system includes a laser beam which is modulated with the baseband video information. The beam is divided into a reference beam and a data beam. A beam deflector scans the data beam through a chosen angle at the horizontal television sweep rate, while the reference beam is unaffected. The reference beam and data beam are intersected at the surface of a record medium and form a surface relief hologram on that surface. Since the data beam is being scanned at the horizontal sweep rate, one-dimensional line images, each of which contains the baseband video information for one horizontal television line interval, are holographically recorded. The record medium is rotated relative to the data beam and reference beam so that a spiral track containing a plurality of the holograms of one-dimensional line images is formed in the surface. During a playback, the location of the spiral guiding track is sensed and one of the hologram forming beams is duplicated thereby reconstructing the other. The reconstructed beam is detected and the baseband video information removed therefrom for application to a standard television receiver.

42 Claims, 8 Drawing Figures

READING ONE-DIMENSIONAL LINE IMAGE HOLOGRAMS OF A VIDEO FROM A DISC WITH A GUIDE TRACK

BACKGROUND OF THE INVENTION

This invention is related generally to holographic recording and playback systems and is more particularly concerned with a holographic system for recording on and retrieving video information from a rotatable disc of material.

Since the earliest days of television, a means has been sought by which television programming may be recorded in a convenient and easily mass reproducible format. Throughout the period of time in which a solution to this problem has been sought, the phonographic recording technique for audio information has been present and developing. Therefore, it is not surprising that a very large number of the proposed solutions have utilized a disc format for the recording medium.

Although the disc format has been widely considered, the manner in which the video information is impressed onto and retrieved from the disc has varied very widely. In the earliest attempts, a standard phonographic technique was utilized. This was possible because at the time a 30 line, 30 frames per second, non-interlaced system requiring a bandwidth on the order of 10 to 15 kHz was utilized. Present day television in the United States requires a bandwidth of about up to 5 MHz in a 525 line, 60 fields (30 frames) per second, interlaced system. The information capacity of the system is thus required to be at least 300 times greater than is capable of being recorded in a standard phonograph format.

Among the modern video disc proposals, one technique is closely analogous to that of conventional audio recording. A very thin plastic disc has a single spiral groove therein much like a standard phonograph record; however, the grooves are much finer and are much more closely spaced, about 140 grooves per millimeter. The disc is revolved at a rate of 1800 revolutions per minute, i.e., once for every television frame. The modulation in the groove is up and down instead of lateral as in standard phonographic recordings. The sound is carried on the same groove by pulse position modulation. The information is retrieved by a pressure sensitive piezoceramic pickup unit.

Another similar technique has been announced in which a metallically coated sapphire stylus is caused to ride in a modulated groove in a video disc and senses variations in the electrical capacitance between its coating and a metallic covering on the video disc.

Some other techniques utilize an optical data pattern in a single spiral track on a video disc. In such systems, it is again conventional to utilize a rotational velocity of 1800 revolutions per minute. The information for the reproduction of the television image is recorded as a succession of short grooves or pits of variable length and repetition frequency. If a spot of light falls on the surface of the disc between two of the pits, most of the light will be reflected. If, on the other hand, the spot falls on one of the pits, the light will be deflected by diffraction at the pit in such a way that most of it is not returned to an objective lens. In this manner, the intensity of the light reflected through the aperture of the lens is modulated by the pattern of pits and grooves. The grooves are necessarily very closely spaced, and extremely precise optical tracking is a requirement of the system.

This system does not utilize a stylus for tracking the groove as in conventional audio recording. The tracking is accomplished by ultra-precise positioning of the pickup head above the groove in the surface of the disc. This tracking technique requires feedback-guided servomechanism pickup arm drives together with delicate electronics and critically adjustable mechanical mechanisms. Such an electromechanical system is not generally believed to be compatible with low cost, consumer oriented video playback systems.

Holographic systems have also been proposed for use in video disc technology. One such system is shown in British patent specification No. 1,139,955. In this holographic system, a series of holograms is recorded on a disc of material as surface relief holograms. The series of holograms are arranged in a spiral on the surface of the disc. Each successive individual hologram constitutes all of the necessary information for reconstructing one complete television frame. In other words, the holographically recorded video disc is more analogous to a strip of motion picture film than to a phonographic audio recording.

In principle, this technique appears fairly suitable for use in the retrieval of video programming. However, several serious problems arise with this system which preclude any possibility of it becoming a commercial reality. Primary among these problems is a need for a high resolution, sensitive vidicon or other two-dimensional image sensor in the playback apparatus to convert the complete frame of information to serial information accepted by a conventional television receiver. In some later versions of the system, two or more registered vidicons are required in order to achieve playback. Obviously, when the electronics required for such a system are added to the normal complexities of mechanical synchronization and optical readout, a system is presented which cannot conveniently be reduced in cost to a point where commercial feasibility is realizable. Furthermore, this video disc cannot be recorded in real-time, but must first be electrically encoded and recorded on film before transferring the information to the video disc.

Other nonvideo disc systems have also utilized holograms for recording and reproducing television signals. For example, U.S. Pat. No. 3,657,473 teaches a system in which a modulated data beam is scanned through a range of intersection angles with a strip of film at the horizontal sweep rate. The intersection angles are in a plane which is generally normal to the film and which contains the long dimension of the film strip. At the same time, both the data beam and reference beam are swept across the surface of the film strip at the vertical sweep rate in a direction which is orthogonal to the plane of the horizontal sweep. Simultaneously, the film strip is moved slowly in the direction of sweep for the horizontal. During playback, the reference beam is occluded and the data beam is swept across the film strip in the original manner. While this system, with the film packaged in cassettes, is perhaps an alternative to the video disc type of system, it suffers greatly in that the cassettes of holographically recorded material are not as susceptible as embossed one-piece disc to mass production at prices within a range which might be considered suitable for a home entertainment market. Furthermore, registration between the film strip and the complex optical scanning apparatus is difficult to achieve and may preclude such a system from achieving commercial acceptance.

SUMMARY OF THE INVENTION

Accordingly, it is an object of the present invention to provide a holographic video disc wherein baseband video information for successive horizontal television line intervals is stored in successive holograms of one-dimensional line images arranged in a spiral track.

It is a second object of the invention to provide a playback system for use with such holographic video disc which does not require high rates of revolution for the video disc or complex optical or mechanical systems for tracking a narrow groove in such a video disc.

It is another object of the invention to provide a novel method and apparatus for recording such a holographic video disc.

A further object of the invention is to provide such a holographic video disc which is capable of being mass produced by conventional manufacturing techniques.

Briefly, the invention in its broadest aspects comprises a holographic video disc and methods and apparatus for forming and retrieving information from that video disc. The video disc includes a record medium which has a pair of generally planar parallel surfaces thereon, and a means for indexing a center position for the record medium. A first spiral guiding track is formed in a surface of the recording medium commencing at an outward position and continuing inwardly at a predetermined rate per revolution of the record medium. A second spiral track is formed in a surface of the record medium in an essentially constant spatial relationship to the first spiral guiding track. The second spiral track is comprised of a plurality of individual holograms. Each individual hologram in the second spiral track contains information for reconstructing a one-dimensional line image containing baseband video information for one successive horizontal television line interval. Each individual hologram is representative of an interference pattern formed by the intersection of a data beam and a reference beam, at least one of the beams having baseband video information for one successive horizontal television line interval modulated thereon. Both of these beams are focussed at an image plane lying optically beyond and parallel to the surfaces of the record medium.

The holographic video disc recording system includes a source of a beam of coherent energy. A beam divider separates the beam of coherent energy into a reference beam and a data beam. A baseband video electrical signal is generated and is still utilized to modulate at least one of the beams of coherent energy. A beam deflector scans the data beam through a preselected angle at a repetition rate essentially equal to and synchronized with the horizontal sweep rate of the baseband video electrical signal. The reference beam bypasses the beam deflector so that a spatial relationship between the scanning data beam and the reference beam is maintained. The scanning data beam and the reference beam are intersected at a record medium so that the beams interfere and form a hologram of a one-dimensional line image containing the baseband video information in the record medium. The preselected angle of scan determines the data capacity of the hologram in the record medium and the redundancy contained therein. The scanning data beam and the reference beam are focussed at a readout plane optically located beyond the record medium. Means are also provided for moving the record medium relative and generally lateral to the scanning data beam and the reference beam so that the spiral track of the plurality of one-dimensional holographic line images is formed in the record medium commencing at an outward position and continuing inwardly at a predetermined rate per revolution of the record medium relative to the scanning data beam and reference beam. Each successive hologram in the spiral track is then a hologram of a one-dimensional line image containing the baseband video information for one successive horizontal line interval.

The holographic video disc playback system has a means for rotating a holographic video disc about a center position at a predetermined rotational speed, the holographic video disc being as described above. An optical system forms and delivers a reconstruction beam of light to an individual hologram. The reconstruction beam of light generally duplicates a selected one of the data beam and the reference beam at the hologram during formation thereby reconstructing the other one of the data beam and reference beam utilized to form the individual hologram. The reconstructed one of the data beam and the reference beam is focussed at the image plane and contains the baseband video information for the one successive television line interval. Means are provided for detecting the baseband video information for the successive horizontal television line interval and for generating a baseband video electrical signal indicative thereof. That signal may be supplied to a television receiver. The means is at least partially positioned in the image plane where the reconstructed beam components are focussed. Means are also provided for sensing the first spiral guiding track formed in a surface of the record medium and maintaining the reconstruction beam of light in a stable relationship thereto. In this manner, the reconstruction beam of light is maintained in a stable relationship to the second spiral track. The predetermined rotational speed is such that the plurality of individual holograms are reconstructed and detected at a rate which is compatible to the television receiver so that a complete image is formed by the television receiver in a conventional manner.

Further objects, advantages and features of the invention will be apparent in the arrangement and construction of the constituent parts of the apparatus, in detail, as set forth in the following specification taken together with the accompanying drawing.

DETAILED DESCRIPTION OF THE PREFERRED EMBODIMENTS

In referring to the various figures of the drawing hereinbelow, like reference numerals will be utilized to refer to identical parts of the apparatus.

Figure 1:
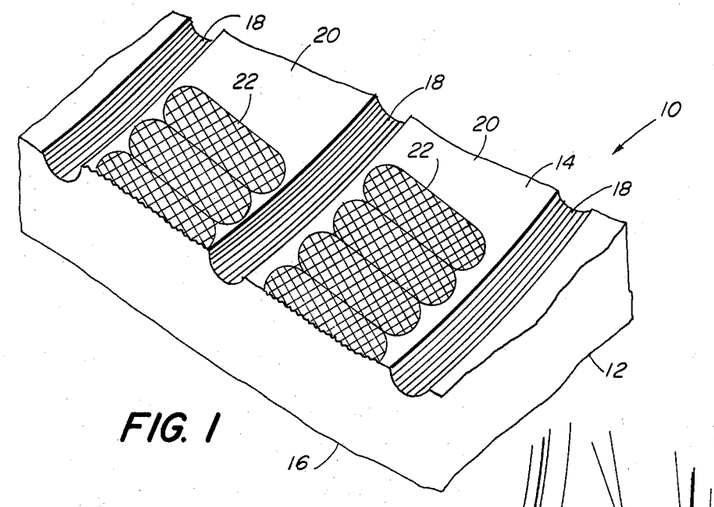
FIG. 1 is a greatly enlarged fragmentary isometric view of a portion of a holographic video disc according to the present invention.

Referring initially to FIG. 1, there is shown, in greatly enlarged form, a fragmentary portion of a preferred embodiment of a holographic video disc according to the present invention, to which the reference numeral 10 generally refers. The holographic video disc 10 is comprised of a record medium 12 having a pair of generally planar parallel surfaces 14 and 16 thereon. The record medium also includes a means for indexing a center position for the record medium which is not shown in this figure. Such a means may conveniently be a carefully centered hole in the video disc which is intended to mate with a spindle on a turntable, in much the same manner as standard phonograph records.

A first spiral track 18 is formed in a surface of the record medium 12 and serves primarily as a guide for orienting the optical system of a playback unit as will be explained more fully hereinbelow. The spiral track 18 commences at an outward position on the record medium 12 and continues inwardly at a predetermined rate per revolution for the record medium. Although many physical forms may be incorporated in the record medium 12 for the first spiral guiding track 18, the presently preferred form is a narrow groove, similar to that in phonograph records.

A second spiral track 20 is also formed in a surface of the record medium 12 and may be on either the same surface as the spiral guiding track 18 or on the opposing planar surface so long as an essentially constant spatial relationship to the first guiding track 18 is maintained throughout the respective lengths of the two tracks. The second spiral track 20 is comprised of a plurality of individual holograms as are shown schematically in FIG. 1 and are identified by the reference numeral 22. Each successive hologram 22 in the spiral track 20 is a hologram of a one-dimensional line image containing baseband video information for one successive horizontal television line interval. In the preferred embodiment of the invention, the two spiral tracks 18 and 20 are formed immediately adjacent to each other in a single planar surface 14 of the record medium 12.

In the preferred embodiments, the spiral guide groove 18 is much like a conventional phonograph record groove, but serving primarily to guide a pickup arm of a playback unit over the video disc 10. Since the two tracks are in a constant spatial relationship, the second track 20 is thereby also in a constant position relative to the pickup arm. This is necessary for the retrieval of the intelligence recorded in each of the separate holograms. In some embodiments of the invention, the groove 18 is completely smooth and unmodulated and functions only to guide the pickup arm. However, in other embodiments of the invention, relatively low frequency information, such as low fidelity audio or timing or indexing information may be imposed in this groove in a manner which is well known in the phonographic recording art. Any information which is so modulated in the groove 18 must be of fairly low frequency because the video disc 10 of the present invention is only required to turn at a very low rate of revolution, e.g., about 10 rpm, during playback for reasons which will become more apparent hereinbelow.

The physical dimensions of the video disc 10 are not at all critical. The thickness of the record medium 12 may range from approximately 0.2 to several millimeters. The diameter may range from approximately 100 millimeters to at least the 300 millimeter diameter of standard long playing phonograph records. The dimensions of the record medium 12 depend more upon the specific application of the video disc 10 and market considerations than to any intrinsic limitations in the system. Of course, the diameter of the record medium 12 has a direct relationship to the quantity of information which may be stored thereon; hence, larger video discs are capable of longer playing times.

In the preferred embodiments of the present invention, the individual holograms 22 which are formed in the surface of the record medium 12 are a series of surface relief holograms. Surface relief holograms per se are well known in the art and are particularly susceptible to mass manufacturing methods. Since both the guiding track 18 and the surface relief holograms 22 of the preferred embodiments are formed by contouring the surface of the video disc 10, mass methods of manufacture, such as embossing the information onto the surface of a preformed disc with minimal heat and pressure, may be applied to the replication of the video discs according to the present invention.

Generally speaking, the following procedure could be utilized during the formation of the video disc 10. A disc of record medium material 12 of an appropriate size is overcoated with a thin layer of a photoresist or other photosensitive material which when processed yields a surface relief pattern corresponding to the localized intensity of light exposure thereon. The spiral guiding groove 18 may be emplaced on the video disc 10 at this point or at any other convenient point either preceding the exposure step or later in the process. Holographic exposures are then made on the photosensitive medium according to the methods to be described hereinbelow.

The recorded video disc 10 is processed to yield a spiral track 20 of individual surface relief holograms 22. A durable metallic stamping master may then be prepared, assuming that the original recording material 12 is not durable enough to act as a master per se, by depositing a layer of a suitable metal such as nickel onto the surface of the recorded disc 10 and then separating the original recorded disc from the metal. A metallic negative copy of the surface relief holographic pattern on the original video disc 10 is thereby obtained. This metallic stamping master may then be used to impress the recorded pattern into a sequence of blank plastic discs thereby making mass replication of the video disc 10 possible. The precise details of this replication process do not form a part of the present invention and will not be discussed in greater detail herein.

Since the holograms 22 are each recordings of a one-dimensional line image preferably containing both the audio and video information for a single horizontal television line interval, the size of the individual holograms is critical in only one direction, that is, parallel to the line image to be read out. In the other direction, the individual holograms may have any convenient size. The only requirement is that the individual holograms be spaced so that they may be separated during the reconstruction process and readout. The length of the hologram 22 in the direction parallel to the line image must be at least large as the minimum size required to store the amount of data desired in the individual hologram. Preferably, for ideal television resolution at the present time, this corresponds to an amount of data of approximately 500 resolvable spots. However, if less than ideal television resolution can be tolerated, the number of resolvable spots may be decreased. It presently appears that adequate resolution for many purposes may be achieved with 350 resolvable spots for each of the holograms. Therefore, for a two-fold redundancy, 700 resolvable spots are necessary.

From well known optical theory, 500 resolvable spots yields a length for an individual hologram in the critical direction of approximately 0.25 millimeter, assuming a recording light wavelength of approximately 0.5 micrometers and an optical numerical aperture of 1.0. To incorporate a two-fold redundancy of the recorded information, it is preferable that the individual holograms be approximately 0.5 millimeter in length. This provides a significant measure of resistance to deterioration of image quality through scratches to the record medium and various other defects which may occur to the materials or during recording and manufacturing processes. With only one television line image to be recorded per hologram, the width of the hologram perpendicular to the line image is restricted primarily by the difficulty of efficiently illuminating an area, one of whose dimensions is smaller than the other, while being careful not to illuminate the adjacent areas. Since there are many approaches and technological compromises which may be incorporated into a playback system for such a holographic video disc, it is preferred presently that the holograms be considerably longer along the direction of the line image than the width. Preferably, the length to width aspect ratio of the individual holograms is of the order of 10 to 1 to 100 to 1.

The individual line image holograms 22 are oriented nominally relative to each other as shown in FIG. 1. The long (0.5 millimeter) dimension is oriented along the radius of the video disc 10 while the other, narrow, dimension is oriented tangent to the direction of the second spiral track 20. As the video disc 10 rotates, the series of holograms 22 pass successively through an optical system (which system will be discussed in greater detail hereinbelow ) to be read out at the horizontal television line rate, e.g., for NTSC color, 15,734 individual holograms per second. Therefore, for a video disc 10 having an outside track diameter of approximately 300 millimeters and holograms whose dimension tangent to the spiral track is approximately 0.01 millimeter, a rotational velocity of about 10 revolutions per minute is sufficient at the outside track. If the inside track is 150 millimeters in diameter, the required speed is 20 revolutions per minute.

The slow rotational speed of video discs of the present invention must be contrasted with the approximately 1800 revolutions per minute rotational speed of the prior art video disc systems discussed hereinabove. The low rotational speed allows for the inclusion of a feature in at least some embodiments of the present invention which may result in greatly increased commercial feasibility. That feature is the use of a mechanical groove in the video disc surface for guidance purposes during the informational retrieval (playback) process. If such mechanical groove tracking were to have been utilized in the prior art high rotational speed video discs, the grooves would require a great deal more surface space on the video disc than would the data track, thereby significantly reducing the playing time. Furthermore, the high rotational speeds would present considerable mechanical problems in retaining a follower in the groove, and wear of the groove would destroy registration in a low number of uses. However, with the extremely slow rotational velocity of the holographic video discs of the present invention, the mechanical guiding grooves occupy only a small fraction of the surface area of the disc because they are considerably narrower than the data tracks. Also, wear problems become negligible thereby affording long useful lives for the holographic video discs.

During the playback of the holographic video disc 10, the same number of individual holograms 22 must be reconstructed during each second in order to generate a baseband video signal of a form which is compatible with a standard television receiver. There are at least two ways of accomplishing this requirement. The simplest technique is to record the same number of individual holograms 22 during each revolution of the holographic video disc 10 so that the disc can be rotated at a constant rotational velocity during playback. However, this technique results in there being a less than optimum information storage density over the surface of the holographic video disc. For example, only one-half of the information density can be recorded on a 360° rotational segment of the track at the periphery of the surface of the holographic video disc as can be stored in such a segment at one-half of that peripheral radius. The information packing density is, therefore, completely controlled by the discrimination capabilities of the playback system at the innermost segment of the data track. All other portions of the spiral data track are necessarily at a less than optimum information packing density.

Another means by which the requisite constant rate playback can be achieved is to record the same number of holograms per unit length of spiral track throughout the entire recording area on the holographic video disc 10. This technique achieves an optimal information packing density throughout the surface of the holographic video disc. Therefore, a significant increase in playing time per unit area relative to the constant rotational rate form is accomplished. However, to achieve the constant playback rate, the playback unit utilized is required to rotate the holographic video disc at a variable speed. This, of course, increases the complexity of that playback unit. Both of these schemes as well as others which may be devised by those in the art are within the purview of the invention.

Figure 2:
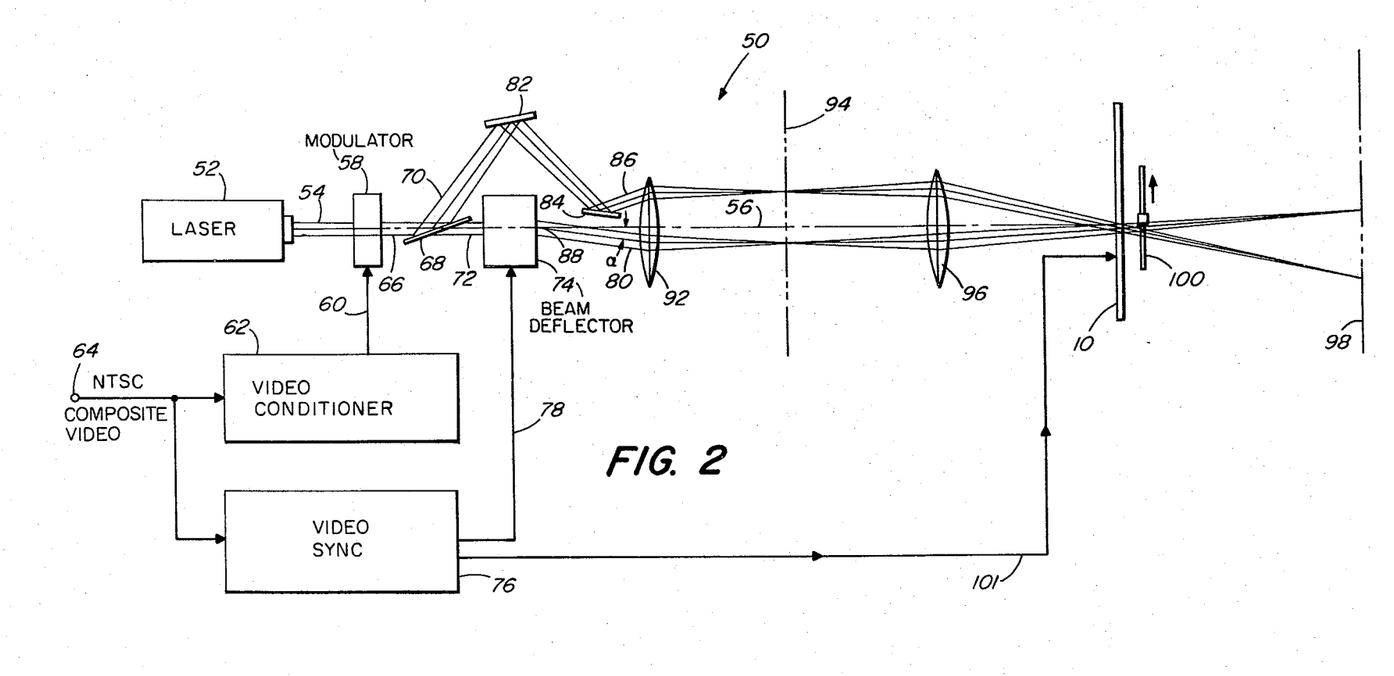
FIG. 2 is a schematic optical diagram of a preferred embodiment of a system for recording holograms on a video disc according to the present invention.

Referring now to FIG. 2, there is shown a preferred embodiment of a holographic video disc recording system according to the present invention which is identified generally by the reference numeral 50. A source 52, such as a laser, emits a generally collimated beam 54 of coherent energy along an optical axis 56. The laser 52 may operate in the visible, infrared or ultraviolet portion of the electromagnetic spectrum, depending primarily upon the spectral sensitivities of the photosensitive material chosen for utilization in the formation of the video disc 10.

The output beam 54 from the laser source 52 first encounters an electro-optic modulator 58 which intensity modulates the beam of coherent energy in accordance with an electrical signal on a line 60 from a video conditioner circuit 62. The video conditioner circuit 62 receives NTSC or other conventional format such as PAL composite video information from an input terminal 64 and supplies a baseband video electrical signal on the line 60 to the electro-optic modulator 58. Therefore, the output beam 66 from the electro-optic modulator 58 is intensity modulated in real time with the baseband video information.

The electro-optic modulator 58 may be of any desired form which is capable of imposing real-time intensity modulation on a steady state optical carrier. The modulator may operate, for example, through use of the Pockels, Faraday or Kerr effects. Many such devices are found in the prior art and may be incorporated in the apparatus of the present invention.

The video conditioner circuit 62 serves to amplify the incoming signal to useful levels and may, depending upon the format of the recorded holograms on the video disc 10 and the discrimination capabilities of the playback unit, preprocess the baseband video signal to aid in the discrimination function during retrieval.

The modulated laser beam 66 which is derived from the electro-optic modulator 58 is incident upon a beam splitter 68 where it is divided into a reference beam 70 and a data beam 72. In this embodiment, both of the beams are modulated with the baseband video information; therefore, the labels applied to them are quite arbitrary. The data beam 72 is applied to a beam deflector 74 which scans the data beam through a preselected angle α. The scanning of the data beam 72 by the beam deflector 74 is controlled by a video sync circuit 76 which applies a deflection signal at the horizontal television line repetition rate via a line 78 to the data beam deflector 74. The input of the video sync circuit 76 is also connected to the input terminal 64; therefore, the scanning rate of the data beam deflector 74 is synchronized with the baseband video information impressed on the beam of coherent energy by the electro-optic modulator 58 yielding a scanning modulated data beam 80.

As stated above, the data beam deflector 74 is preferably an electro-optic device, such as those beam deflectors shown in U.S. Pat. Nos. 3,357,771 and 3,458,247; however, other means by which the deflection of the data beam can be accomplished is intended to be included within the purview of the invention. Such a means includes vibrating mirrors, such as shown in U.S. Pat. No. 3,544,201, rotating polygonal mirros, such as shown in U.S. Pat. No. 3,597,536, magneto-optic modulators and accousto-optic devices. The specific deflector employed is not critical so long as the data beam deflector 74 is capable of deflecting the data beam 72 through an angle α which is sufficient to record a holographic image of the required television resolution at the repetition rate of television horizontal lines.

$$\alpha \approx N\lambda/L$$

where N is the number of resolved picture elements required per television line interval, L is the radial length of the hologram, and λ is the wavelength of the recording laser light.

The reference beam 70, in this embodiment, is reflected by the beam splitter 68 and a pair of subsequent reflectors 82 and 84 past the data beam deflector 74. The reflectors 82 and 84 are oriented such that the finally reflected reference beam 86 appears to emerge or travel away from the intersection 88 of the optical axis 56 with the center of scan of the data beam deflector 74. Thus, the final reference beam 86 and the scanning data beam 80 both appear to diverge from a fixed virtual common point in the scanner 74. However, the rays comprising each of the respective beams 86 and 80 are collimated. Although the reflective surfaces 82 and 84 are utilized in the preferred embodiment, any other means for bypassing the data beam deflector 74 with the reference beam 70 is also intended to be included within the purview of the invention. The requisite feature is that the resulting reference beam 86 and the scanning data beam 80 have a defined spatial interrelationship.

A first positive optical element 92, such as a lens, is aligned on the optical axis 56 at a distance of one focal length from the center of scan 88 of the data beam deflector 74. The lens 92 is large enough to intercept both the reference beam 86 and the scanning data beam 80 throughout its angle of scan α. The lens 92 serves to render the central rays in the reference beam 86 and in the scanning data beam 80 parallel to each other and to the optical axis 56. The optical element 92 also focusses the rays within each separate beam at an intermediate image synthesis plane 94.

A second positive optical element 96, once again depicted as a lens, is aligned on the optical axis 56 at a distance beyond the intermediate synthesis plane 94. Once again, the lens 96 is large enough in diameter to intercept both the scanning data beam 80 and the reference beam 86 at all positions. The lens 96 serves to cause the scanning data beam and the reference beam to be intersected at the video disc 10 so that the scanning data beam 80 and the reference beam 86 interfere and form a hologram of a one-dimensional line image containing the baseband video information imposed on the beams by the electro-optic modulator 58. The lens 96 also serves to focus the scanning data beam 88 and the reference beam 86 at an image plane 98 which is located optically beyond the video disc 10. The plane 98 will become important during the retrieval process which will be discussed hereinbelow.

In operation, the electrooptic modulator 58 varies the intensity of the laser beam 54 in accordance with the baseband video signal on the line 60. The data beam deflector 74 scans the data beam 80 through a one-dimensional range of angles α, thereby yielding a moving, modulated, focussed spot in the intermediate image synthesis plane 94. The second lens 96 records a pseudo-Fourier transform hologram of the synthesized composite video line in the video disc 10. If the data beam deflector 74 scans a zero retrace linear sweep at the horizontal video line rate and a turntable 100 or other similar electromechanical device serves continuously to rotate and to translate the video disc 10 so as to accomplish a spiral recording track thereon, the composite video signal is thereby recorded as a track of radially extending one-dimensional holograms of line images. Each successive hologram is a hologram of a one-dimensional line image containing the baseband video information for one successive horizontal television line interval.

If the spiral guiding track 18 had been imposed on the video disc 10 previously, it can function as a guide during the recording process.

Figure 3:
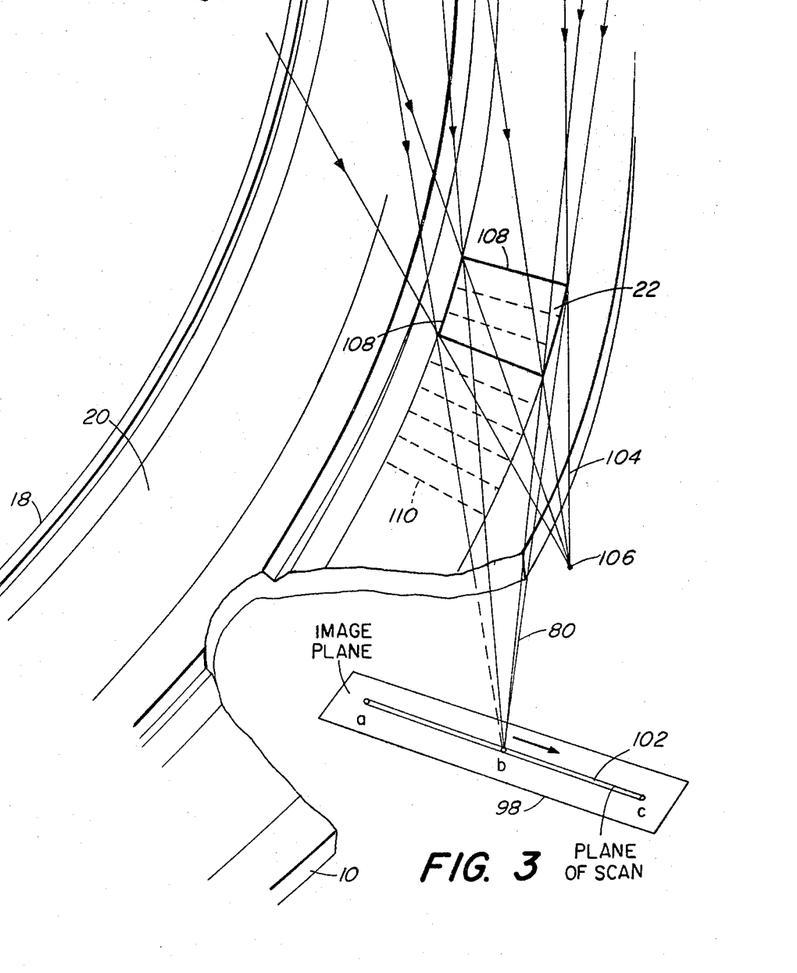
FIG. 3 is a partially broken away, greatly enlarged, isometric view of a portion of a record medium for the video disc showing the interferring reference and data beams which may be utilized to form individual holograms on the video disc.

Turning now to FIG. 3, a greatly enlarged schematic representation of the preferred arrangement of the scanning data beam 80 and the reference beam 86 are shown at the video disc 10 and the image plane 98. In the embodiment illustrated in FIG. 2 of the drawing, the reference beam 86 lies in the plane of scan of the scanning data beam 80. Although this arrangement is included within the purview of the invention, certain disadvantages adhere to this arrangement for constructing the one-dimensional holograms 22. That is, the effects of intermodulation and multiple diffraction orders, due to the use of nonlinear phase recording materials, include spurious and ghost images away from the line image occurring along the line including that image. These result in unwanted noise in the playback apparatus.

The arrangement shown in FIG. 3 serves to overcome this problem. The scanning data beam 80 is shown intersecting the video disc 10 at the area identified as 22 where the hologram is to be formed. The plane of scan is shown schematically by the line 102 where it intersects with the image plane 98. Three points on this line a, b and c illustrate the plane of scan of the data beam 80. The reference beam 104, in this embodiment, is shown intersecting the image plane 98 at a point 106 which is not included along the line 102. This serves to reduce significantly the aforementioned spurious effects. In addition, if the reference beam is placed relatively close to the plane of the scan for the data beam and near to the central position b of the scanning beam, the largest angle between the reference beam 104 and the data beam 80 is approximately one-half of the largest such angle in the coplanar optical configuration shown in FIG. 2. The position of the reference beam 104 relative to the plane of scan is limited by the need to avoid flare light from falling onto the plane of scan during the reconstruction process. This non-coplanar arrangement allows the spatial frequency recording capability of the recording medium to be only about one half of the capability which is required to record the same information in the arrangement shown in FIG. 2. Therefore, the arrangement of FIG. 3 is preferred.

During the formation of the individual hologram 22 by intersection of the reference beam 104 and the scanning data beam 80, an area bounded by solid lines 108 and fixed in space relative to the optical system is illuminated by both beams. Relative to the rotating video disc 10, this area moves continuously along the spiral data track 20 at a rate somewhat greater than one illuminated area width per horizontal line interval. This is shown schematically by the series of dotted lines 110. Therefore, a considerable degree of overlap necessarily exists between adjacent holograms. Generally speaking, this is not objectionable and compensation for it may be made through various signal conditioning techniques in the playback electronics or preferably through signal preconditioning by the video conditioner circuit 62. If such compensation is not performed, the only effect caused by the overlap is a minimal loss of vertical image resolution.

Figure 4:
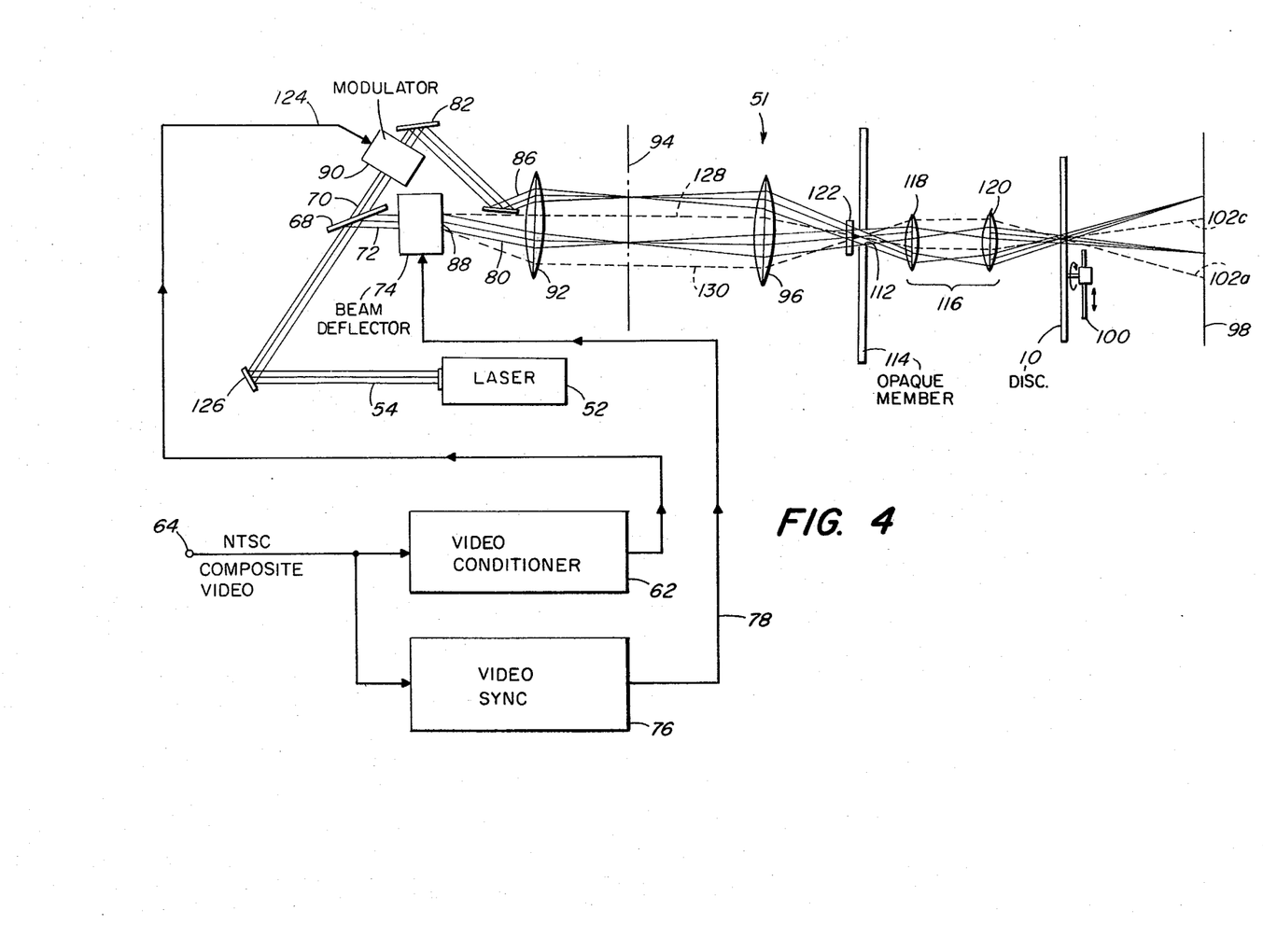
FIG. 4 is a schematic optical diagram of an alternative embodiment of a system for holographically recording the video disc.

FIG. 4 is a schematic optical diagram of an alternative system for recording the individual holograms 22 on a video disc 10. The apparatus shown in FIG. 4 is quite similar to that of FIG. 2 and only the differences therebetween will be discussed at this time. The system shown in FIG. 4 and referred to generally by the reference numeral 51 optically avoids at least a portion of the overlap between adjacent individual holograms as discussed with regard to FIG. 3, thereby easing the constraints imposed on the playback system for discriminating between adjacent holograms.

Basically, the modification consists of the placement of an opaque member 114 having a slit 112 therein at the plane in which the video disc 10 is located in the embodiment shown in FIG. 2. The arrangement serves to limit the size of the beam projected through the slit 112 and onto the video disc 10. The scanning data beam 80 and the reference beam 86 now have a definite size and shape at their point of intersection on the surface of the video disc 10. Preferably, the shape of the beams at the video disc is formed by an oblong aperture 112. The aperture 112 is then re-imaged by a unity power optical system 116 onto the surface of the video disc 10. In this embodiment, the unity power telescope 116 is shown as being comprised of a pair of positive lens elements 118 and 120.

In addition, a cylindrical lens 122 is placed on the optical axis 56 immediately in front of the slit 112. The cylindrical lens 122 is oriented so as to affect the two beams of light passing therethrough only in that direction which is transverse to the direction of scan of the data beam 80. In this manner, the intensity of the light which passes through the slit 112 is increased without detrimentally affecting the distribution in the critical direction.

Another modification which can be made and which is illustrated in FIG. 4 is to incorporate in the reference beam 70 an electro-optic modulator 90 similar to that modulator identified by the reference numeral 58 in FIG. 2. However, the modulator 90 now affects only the reference beam 86. The scanning data beam 80 is unmodulated. Although it is not shown explicitly, it is equally within the purview of the invention that the scanning data beam 80 can also be individually modulated while leaving the reference beam 86 unmodulated. The only requirement of the invention is that at least one of the scanning data beam and the reference beam be modulated with the baseband video information. In this embodiment, the modulator 90 is driven by a signal on a line 124 from the video conditioner circuit 62 in a manner which is similar to the driving of the modulator 58 in the embodiment of FIG. 2.

An additional reflective element 126 is included in the apparatus in order to fold the collimated beam of coherent energy 54 emitted by the laser 52 back into the succeeding apparatus. It is within the purview of the invention that various such additional optical elements may be inserted where they are found to be necessary or desirable for particular applications of the invention.

A pair of dotted lines 128 and 130 are included within the schematic optical diagram of FIG. 4 to show the envelope of the central ray of the scanning data beam 80 within the apparatus for recording the holographic video disc of the present invention.

Figure 5:
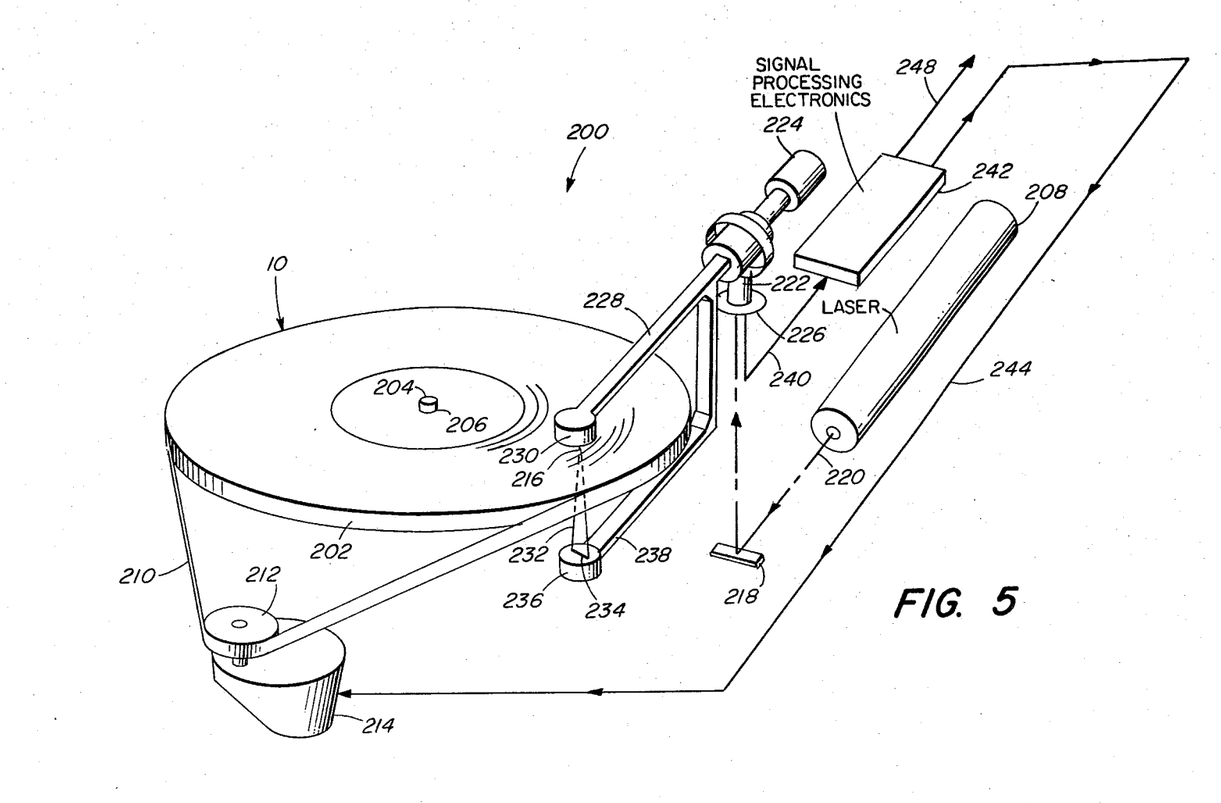
FIG. 5 is a schematic, isometric view of the essential components comprising a presently preferred embodiment of a holographic video disc playback system according to the present invention.

Turning now to FIG. 5 of the drawing, there is shown a partially schematic isometric view of a holographic video disc playback system according to the present invention which is identified generally by the reference numeral 200. Although the playback system 200 in practice is mounted within a cabinet or other similar structural and protective means, the components here are shown in generally schematic form so that the interrelationships between those components can be more readily appreciated.

The holographic video disc 10 is mounted on and supported by a turntable 202 which has a center spindle 204 therein similar to the standard phonographic turntable. The spindle 204 mates with a hole 206 which is formed in the holographic video disc 10 at its center and which functions to index the center position of the holographic video disc 10. The turntable 202 is intended solely to rotate the holographic video disc 10 about that center position at a predetermined rotational speed. The predetermined rotational speed is either constant or variable as discussed hereinabove depending upon the spacing of the individual line image holograms along the length of the spiral data track 20.

The particular design of the turntable and its associated mechanisms does not form a part of the present invention. Therefore, only those special features which either are required to be incorporated into that turntable or are desirable will be described herein. In the embodiment shown, the turntable 202 is formed of a material which is optically transparent at the emission wavelength of a laser 208. The material of the turntable 202 should also be sufficiently homogeneous that energy from the laser which is transmitted therethrough is not distorted by the material. The laser 208 is utilized to read out the baseband video information which is stored in the video disc 10. The turntable 202 is shown as being driven by a tension belt 210 which engages a pully 212 on a turntable drive unit 214. The turntable drive unit 214 is preferably at least slightly variable in its rotational speed for reasons to be discussed more fully hereinbelow. Furthermore, other mechanical drive arrangements can be used for the turntable 202.

The playback system 200 includes an optical system for forming and delivering a reconstruction beam of light 216 to an individual line image hologram 22 on the surface of the video disc 10. The reconstruction beam of light 216 generally duplicates at the hologram a selected one of the scanning data beam 80 and the reference beam 86 thereby reconstructing the other one of the scanning data beam and reconstruction beam which were utilized to form that individual hologram. In addition to the laser 208, the reconstruction optical system includes a mirror 218 which deflects the output beam 220 of coherent energy from the laser 208 into the base 222 of a pickup arm 224. The pickup arm 224, in this embodiment, is a bifurcated arm pivoted about its base 222 which is located adjacent to the unitary end of the arm. The means of support for the pickup 224 is shown schematically in the drawing by the ring 226 surrounding the base 222. The upper or first branch 228 of the pickup arm 224 delivers the reconstruction beam to the distal end 230 at which point the reconstruction beam 216 duplicates a selected one of the original hologram forming beams.

Diffraction of the reconstruction beam 216 by the individual line image hologram 22 in the video disc 10 causes the formation of a reconstructed beam 232 corresponding to the other beam utilized during the formation of the individual holograms. A means 234 for detecting the baseband video information for the successive horizontal television line interval is located optically at the image plane in which the formation beams were focussed (see reference numeral 98 in FIGS. 2 through 4). The photodetecting means 234 is disposed physically in the distal end 236 of the second or lower branch 238 of the bifurcated pickup arm 224. The photodetecting means 234 generates a baseband video electrical signal in response to the reconstructed beam components imaged thereon. The detected electrical signal is supplied on a line 240 to a signal processing electronics circuit 242 which is shown schematically in this figure. The signal processing electronics 242 serve to provide a synchronization signal on a line 244 to the turntable drive unit 214 to vary the speed thereof sufficiently to cause the precise number of individual holograms to pass through the reconstruction beam per unit of time. The signal processing electronics 242 also provide an output signal on a line 248 which can be applied to a standard television receiver.

The laser 208 may be of any conventional low power type, such as a helium-neon laser. It need not be of the same type of laser utilized to form the individual holograms, the only difference being that the angle of convergence of the reconstruction beam at the hologram must be somewhat different depending upon the wavelength of the reconstruction beam. The technique for determining the differences in angles of convergence are well known in the art.

The laser 208 should be enclosed in a safe, isolated position, such as within the turntable cabinet, to prevent inadvertent direct viewing of the coherent beam by the user. The bifurcated design of the pickup arm 224 in this embodiment is advantageous because it prevents direct visual access to the beam. The output beam from the laser 208 can also be guided into the pickup arm 224 by any other means such as optical fibers as is well known in the art. Finally, other sources of energy besides lasers can be used during the reconstruction process. However, additional optical components may then be required to condition the output so that the holograms can be read out.

A means, which is not shown in FIG. 5, senses the first spiral guiding track 18 which is formed in the surface of the holographic video disc 10 and maintains the reconstruction beam 216 in a stable relationship thereto. In this manner, because of the constant spatial relationship between the two tracks on the holographic video disc, the reconstruction beam of light 216 is also maintained in a stable relationship to the second spiral track 20 containing the plurality of individual holograms.

Figure 6:
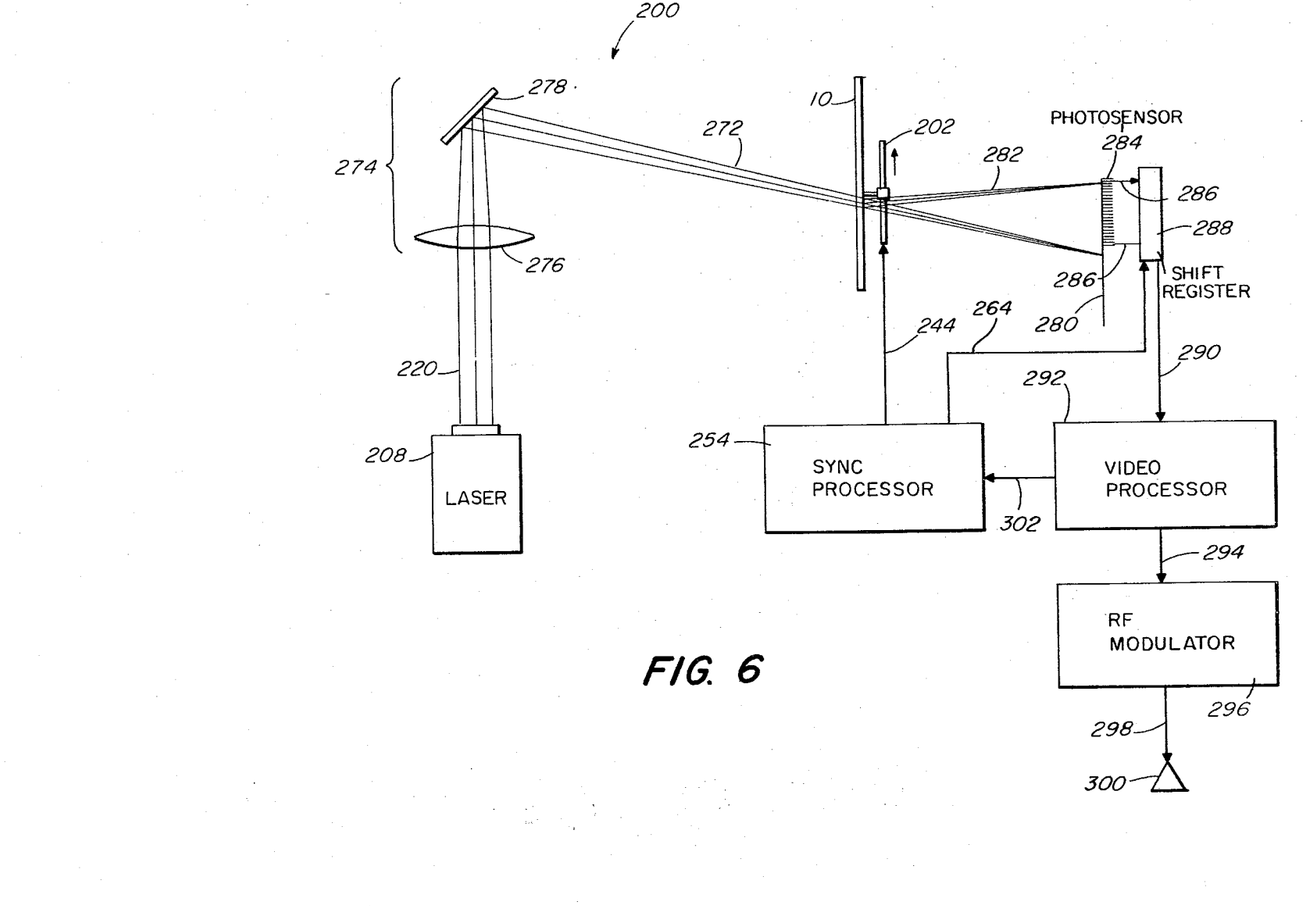
FIG. 6 is a schematic optical diagram of a holographic video disc playback system as is shown in FIG. 5, the system utilizing a stationary beam for reading out.

FIG. 6 shows an exemplary optical system 200 which can be utilized to reconstruct a hologram in the video disc 10. The laser 208 supplies a generally collimated output beam 220 of coherent energy. An optical system 274 operates on the laser beam 220 to essentially duplicate the reference beam 86 utilized during the formation of the hologram in the video disc 10. In this embodiment, the optical system 274 is comprised of a positive optical element 276, such as a lens on a telescopic optical system formed from a pair of lenses and a reflective surface 278. The output of the optical system 274 is a stationary beam of light 272 having a constant spatial relationship to the means for sensing the first spiral guiding track in the surface of the holographic video disc 10. The beam of light is focussed onto a plane 280 where the readout takes place.

When the reconstruction beam 272 is incident on the position of an individual hologram in the continuum of partially overlapping holograms in the second spiral track in the video disc 10, a continuum of data beam components 282 is reconstructed which corresponds to a single scan of the data beam 80 through the preselected angle α while forming the individual holograms. The continuum 282 of the data beam components is focussed essentially to a line in the image plane 280. The continuum 282 of data beam components contains the baseband video information for the one successive horizontal television line interval which is recorded in the individual hologram.

A photosensor 284 is located at this line in the image plane 280. The photosensor 284 may be of any form which allows the retrieval of the distributive intensity information contained within the reconstruction beam. For example, a linear array of individual photosensitive elements can be emplaced along the line in the image plane 280 and can be electrically connected to various signal processing electronics. However, this arrangement is not preferable at this time.

The two presently preferred arrangements for use in detecting the data in the readout in this embodiment are the so-called charge-coupled devices and charge-injection devices.

The image resolution of the photosensitive device should be compatible with the number of resolvable spots recorded in the individual hologram, e.g., for standard television reception, at least 350. For purposes of the present discussion, the primary difference between the charge-coupled device and charge-injection device is the manner in which the detected information is transferred to the succeeding electronics. When a charge-coupled device is utilized, the individual sensors therein accumulate intensity data simultaneously for a period of time. At the conclusion of this period of time, a signal is given to the charge-coupled device and each such element therein transfers the intensity information simultaneously along a plurality of lines such as identified by the reference numerals 286 to a shift register 288. The signal is then transferred in a serial manner from the shift register 288 to an output line 290. When a charge-injection device is utilized, the various individual elements likewise accumulate intensity data for a fixed period of time. However, the information is transferred from the individual sensors directly to a common output line 290 in a serial manner rather than simultaneously.

The baseband video information is then transferred through the line 290 to a video processor circuit 292. The video processor circuit 292 serves to improve the quality of the signal from the photosensor 284, such as by compensating for a partial overlap in individual holograms which naturally occurs as was discussed hereinabove. It also processes the required synchronizing information as will be explained hereinbelow. The output of the video processor circuit 292 on a line 294 is supplied to a RF modulator 296 which may be tuned to the frequency of an unused channel for the local area wherein the video playback unit is to be utilized. The baseband video information is imposed on the carrier at that frequency and supplied via a line 298 to the antenna terminals 300 of a conventional television receiver.

FIG. 6 also indicates a means for two different kinds of synchronization of the disc player components. The signal obtained via the image detector output line 290 is a composite baseband video signal, and as such contains complete horizontal and vertical synchronization information. However, the video conditioner 62 of the recording system of FIG. 2 or of FIG. 4 modifies electronically the form of the horizontal synchronizing information in a predetermined way from one recorded horizontal video line to the next.

The exact form of this new horizontal synchronizing information, and the manner in which it is varied from one hologram to the next, is not included within the purview of this invention, as there are a variety of possible forms which may be chosen for different applications.

The special format video signal on line 290 is processed by the video processor circuit 292. The video processor circuit 292 separates out the special horizontal synchronizing information, sending it via a line 302 to a sync processor circuit 254, and also reinserts standard horizontal synchronizing information into the video signal to be sent via a line 294 to the RF modulator 296 described hereinabove.

The sync processor circuit 254 examines and compares the succession of horizontal synchronizing pulses. First, it determines the rate of holograms passing by the image detector 284 and, if necessary, adjusts the rotational speed of the turntable drive 214 via line 244. Second, it determines the optimal times for transferring data from the image detector 284 to the shift register 288, and executes this transfer at the proper time via a line 264.

Although it has been stated previously hereinabove, that a laser 208 is preferred for use in the playback system, it is not intended that the invention be restricted to the use of a laser for the reconstruction beam light source. Any other source of light which supplies a sufficiently coherent beam of light to reconstruct the individual holograms with the necessary television resolution is also included within the purview of the invention.

Figure 7:
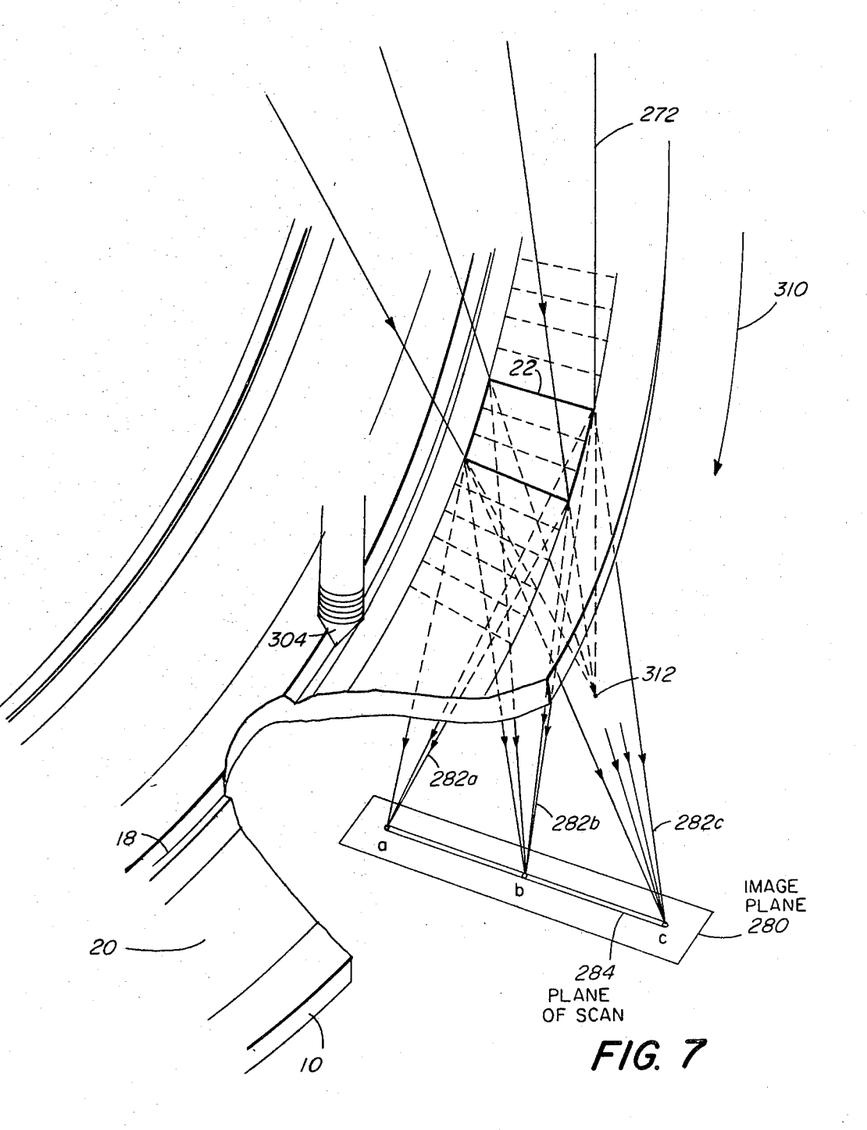
FIG. 7 is a greatly enlarged, partially broken away, isometric view of a portion of the video disc, similar to FIG. 3, in which the beam used for reading out the components of the reconstructed beam are shown.

FIG. 7, which is similar to FIG. 3, is a greatly enlarged view of the video disc 10 during the reconstuction process. Onece again, the preferred arrangement is one in which the reconstruction beam 272 is located out of the plane of the reconstructed beam 282. The reconstruction beam 272 is focussed to a point 312 in the image plane 280. As can be seen, a plurality of data beam components, illustrated by 282a, 282b, and 282c, are shown intersecting the linear photodetector device 284 at points a, b, and c respectively corresponding to the three points shown in the image plane 98 in FIG. 3 of the drawing.

Figure 8:
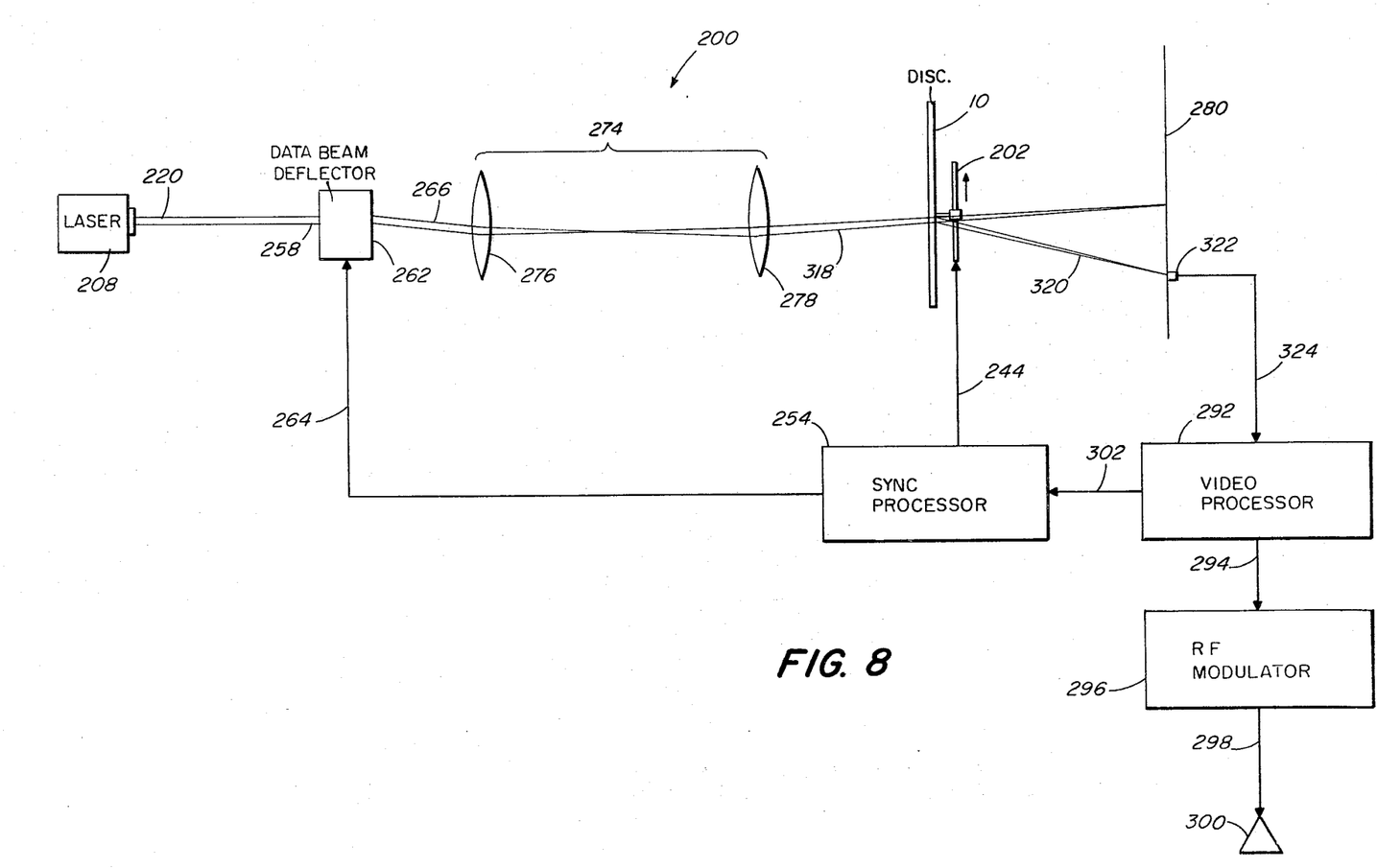
FIG. 8 is a schematic diagram of an alternative embodiment of a holographic video disc playback system according to the present invention in which the reconstruction beam is scanned across the holograms of the video disc and a single fixed detector is utilized.

FIG. 8 is an alternative form of the playback apparatus 200 which is similar to the recording apparatus shown in FIG. 2. Therefore, only the differences between the two systems will be discussed at this time. In this embodiment, the reference beam producing and directing means and the laser beam modulator are eliminated. The data beam deflector 262 is now controlled by the signal on the line 264 from the sync processor 254 to scan the data beam 266 through a range of angles analogous to those which formed the individual hologram 22. The scanning data beam 318 is focussed by a lens system 274, which is comprised of a pair of positive lens elements 276 and 278, onto the image plane 280 and passes in a scanning manner through an individual hologram 22 in the video disc 10. When the scanning reconstruction beam 318 scans across an individual hologram, a stationary reconstructed beam 320 is formed which is analogous to the stationary reference beam 86 utilized during the formation of the hologram. The reconstructed beam 320 is incident on a single photodetector element 322 which is located in the image plane 280. In this embodiment, because the reconstruction beam 318 is scanning at the horizontal television line rate, a serial readout of intensity data is achieved by the photodetector element 322. Since only a single element is required during the readout, a shift register is not required in the output electronics and the signal from the photodetector 322 may be supplied directly to the video processor 292 along a line 324.

Although this arrangement appears to be preferable because of the simplicity of the detection process, mechanically this arrangement suffers from a disadvantage in that relatively complex scanning apparatus must be utilized within the equipment. The scanning apparatus must be well synchronized and functioning accurately to provide an output signal on the line 298 which can be utilized for television programming. Such devices are not presently compatible with a mass-produced system for use in the home. However, should such systems become a reality, the playback apparatus shown in FIG. 8 may then be preferable for the reconstruction process.

During the foregoing discussion of the playback apparatus, it has been assumed that the video disc 10 was formed according to the process set forth hereinabove. That process is the presently preferred method of recording such a holographic video disc; however, video discs recorded by other techniques which yield a video disc having the two spiral tracks thereon and in which the second spiral track is comprised of a plurality of individual holograms each of which is a hologram of a one-dimensional line image containing baseband video information for one successive horizontal television line interval can be played back on the apparatus just described, with minor modification of the readout optics.

Furthermore, all of the foregoing discussion has centered on the provision of a transparent video disc and turntable so that the reconstruction process takes place with the beams being transmitted through the video disc to an image plane disposed on the opposite side. This is the presently preferred manner for accomplishing the readouts; however, it is also within the purview of the invention to utilize reflective surface relief holograms on the video disc. With reflective surface relief holograms, the video disc does not need to be transparent and may be formed of any convenient material. In this instance, the photodetecting element or elements are located in the distal end of the pickup arm adjacent to the stylus and the output of the reconstruction optical system. A distinct disadvantage results from this arrangement because errors which occur in the relative orientation of the reconstruction beam and the surface relief holograms are magnified during the reflection process. The recording and playback apparatus and the video disc itself are required as a result to be formed with significantly greater precision, thereby increasing the cost and decreasing the reliability. Therefore, although the reflected version is included within the purview of the invention, it is not the presently preferred embodiment thereof.

While there have been shown and described what are considered to be the presently preferred embodiments of the present invention, it will be obvious to those of ordinary skill in the art that various changes and modifications may be made therein without departing from the spirit of that invention.

I claim:

1. A holographic video disc playback system comprising means for rotating a holographic video disc about a center position at a predetermined rotational speed, the holographic video disc comprising
- a record medium having a pair of generally planar parallel surfaces thereon and a means for indexing a center position on the record medium so that the center positions can be made coincident,
- a first spiral guiding track formed in a surface of the record medium commencing at an outward portion and continuing inwardly at a predetermined rate per revolution of the record medium, and
- a second spiral track formed in a surface of the record medium in an essentially constant spatial relationship to the first spiral guiding track, the second spiral track being comprised of a continuously disposed plurality of individual holograms, each successive hologram in the second spiral track being a hologram of a one-dimensional line image containing baseband video information in the radial direction for one successive horizontal television line interval, and each individual hologram being representative of an interference pattern formed by the intersection of a data beam and a reference beam, at least one of the beams having the baseband video information for one successive horizontal television line interval modulated thereon, both beams being focussed at an image plane lying beyond and parallel to the surfaces of the record medium, an optical system for forming and delivering a reconstruction beam of light to an area fixed in space relative to the optical system and through the continuum of holograms passes, the reconstruction beam of light generally duplicating a selected one of the data beam and the reference beam at the hologram thereby reconstructing the other one of the data beam and the reconstruction beam utilized to form the individual hologram, the reconstructed one of the data beam and the reference beam being focussed at the image plane and containing the baseband video information for the one successive horizontal television line interval, means for detecting the baseband video information for the successive horizontal television line interval and generating a baseband video electrical signal indicative thereof, which signal may be supplied to a television receiver, the means being at least partially positioned in the image plane where the reconstructed beam components are focussed, and means for sensing the first spiral guiding track formed in a surface of the record medium and maintaining the reconstruction beam of light in a stable relationship thereto thereby maintaining the reconstruction beam of light in a stable relationship to the second spiral track, the predetermined rotational speed being such that the plurality of individual holograms are reconstructed and detected at a rate which is compatible with the television receiver so that a complete image is formed by the television receiver in its conventional manner.

2. A holographic video disc playback system according to claim 1, wherein the means for indexing a center position on the record medium is a hole in the center of the record medium, and wherein the means for rotating a holographic video disc is a turntable having an axially disposed spindle which mates closely with the center hole in the record medium.

3. A holographic video disc system according to claim 2, wherein there is further included a pickup arm pivotably mounted adjacent to a first end thereof and adjacent to the turntable so that the distal end of the read-out arm can pass over all of the individual holograms recorded in the second spiral track in the surface of the record medium sequentially as the record medium is rotated, the means for sensing the first spiral guiding track being disposed on the distal end, and the duplicated one of the forming reference beam and data beam exiting from the distal end generally normal to the surface of the record medium.

4. A holographic video disc playback system according to claim 3, wherein the means for detecting the baseband video information is at least partially disposed in the distal end of the pickup arm.

5. A holographic video disc playback system according to claim 4, wherein the optical system includes a source of a beam of coherent energy.

6. A holographic video disc playback system according to claim 5, wherein the source of a beam of coherent energy is a laser.

7. A holographic video disc playback system according to claim 6, wherein the laser is a He-Ne laser.

8. A holographic video disc playback system according to claim 5, wherein the means for detecting includes means for synchronizing the rotational speed of the turntable so that the rate of reconstruction of successive individual holograms coincides with a conventional television horizontal line rate.

9. A holographic video disc playback system according to claim 8, wherein the predetermined rotational speed is variable and is inversely proportional to the radius of the record medium at the location of an individual hologram being reconstructed, the individual holograms being recorded on the record medium at regularly spaced intervals along the length of the second spiral track.

10. A holographic video disc playback system according to claim 8, wherein the predetermined rotational speed is essentially constant, there being an essentially equal number of individual holograms being reconstructed during each revolution of the video disc and turntable.

11. A holographic video disc playback system according to claim 8, wherein the predetermined rotation speed is less than 40 revolutions per minute.

12. A holographic video disc playback system according to claim 8, wherein the photodetecting array is a charge coupled device.

13. A holographic video disc playback system according to claim 8, wherein the first spiral guiding track is a groove formed in a surface of the record medium and the means for sensing the first sprial guiding strack is a stylus depending from the distal end of the pickup arm to engage the grooved spiral guiding track.

14. A holographic video disc playback system according to claim 13, wherein the grooved spiral guiding track is modulated with information and the depending stylus is affixed to a transducer for retrieving the information, the information being different from and related to the information in the second spiral track of holograms.

15. A holographic video disc playback system according to claim 13, wherein there is further included means for conveying the beam of coherent energy from the source of the pickup arm.

16. A holographic video disc playback system according to claim 13, wherein the optical system includes a telescopic optical system.

17. A holographic video disc playback system according to claim 13, wherein the optical system forms and delivers a reconstruction beam of light generally duplicating the reference beam at formation thereby reconstructing the data beam at formation, the data beam at formation having been distributed through a preselected angle at the intersection, the baseband video information for the one successive horizontal television line being sequentially distributed through the preselected angle so that the reconstructed data beam is a continuum of data beam components which are focussed essentially to a line in the image plane.

18. A holographic video disc playback system according to claim 17, wherein the means for detecting the baseband video information includes a photodetecting array distributed along the line in the image plane.

19. A holographic video disc playback system according to claim 18, wherein the photodetecting array is linear array or discrete photodetector elements.

20. A holographic video disc playback system according to claim 18, wherein the photodetecting array is a charge injection device.

21. A holographic video disc playback system according to claim 13, wherein the optical system forms and delivers a reconstruction beam of light which scans through a preselected angle and which duplicates a continuum of the data beam components at formation, the baseband video information for one successive horizontal television line being sequentially distributed through the preselected angle, a stationary reference beam being thereby reconstructed which is focussed to a point in the image plane.

22. A holographic video disc playback system according to claim 21, wherein the optical system includes a beam deflector for scanning the data beam through the preselected angle, the scanning rate of the beam deflector being controlled by the means for synchronizing.

23. A holographic video disc playback system according to claim 22, wherein a single photodetector is located in the image plane at the focus of the reconstructed data beam, the photodetector receiving and detecting the baseband video information in a sequential manner as the reconstruction beam is scanned through the preselected angle.

24. A holographic video disc playback system according to claim 13, wherein the turntable and the video disc are formed of materials transparent to the beam of coherent energy and are capable of transmitting an undistorted optical image therethrough.

25. A holographic video disc playback system according to claim 24, wherein the pickup arm is bifurcated at its distal end with a first branch thereof passing on one side of the turntable and video disc and containing at least a portion of the optical system, and the second branch thereof passing on the other side of the turntable and video disc and containing at least a portion of the means for detecting.

26. A holographic video disc playback system comprising a turntable having an axially disposed spindle for rotating a holographic video disc about a center position of the turntahle at a predetermined rotational speed, the turntable including a holographic video disc supporting surface, the holographic video disc comprising a transparent, circularly disc-shaped record medium having a pair of generally planar parallel surfaces thereon and a centrally located hole in the record medium which mates closely with the spindle to index the center positions of the turntable and record medium, a first spiral, grooved guiding track formed in a planar surface of the record medium commencing at an outward position and continuing inwardly at a predetermined rate per revolution of the record medium, and a second spiral track formed in the planar surface of the record medium in juxtaposition to the first spiral guiding track, the second spiral track being comprised of a continuum of individual surface relief holograms, each successive surface relief hologram in the second spiral track being a hologram of a one-dimensional line image containing radially disposed baseband video information for one successive horizontal television line interval, and each individual hologram being representative of an interference pattern being formed by a scanning data beam and a stationary reference beam, at least one of the beams having baseband video information for one successive horizontal television line interval modulated thereon, both beams being focussed at an image plane lying optically beyond and parallel to the planar surfaces of the record medium, a bifurcated pickup arm pivoted adjacent ot its unitary end adjacent to the turntable such that a branch of the arm can be pivoted into a position on respective sides of the transparent video disc supporting surface so that an individual surface relief hologram in the second spiral track on the record medium may be disposed generally between the distal ends of the branches, an optical system for forming and delivering a reconstruction beam of coherent light through a first branch of the bifurcated pickup arm, the reconstruction beam exiting from the distal end of the first branch toward the distal end of the other branch to the individual hologram, the reconstruction beam of coherent light generally duplicating the reference beam at the hologram to reconstruct a continuum of data beam components corresponding to a single scan of the data beam through the preselected angle while forming the individual hologram, the continuum of data beam components being focussed essentially to a line in the image plane and containing the baseband video information for the one successive horizontal television line interval recorded in the individual hologram, means for detecting the baseband video information for the horizontal television line interval and generating a baseband video electrical signal indicative thereof, which signal may be supplied to a television receiver, the means including a linear array of photosensitive elements disposed in the distal end of the other branch of the bifurcated pickup arm, the array being positioned in the image plane at the line to which the continuum of reconstructed data beam components are focussed, and a stylus attached to the distal end of the first branch of the bifurcated arm for sensing the first spiral guiding track formed in a surface of the record medium and maintaining the reconstruction beam of coherent light in a stable relationship thereto thereby maintaining the reconstruction beam of coherent light in a stable relationship to the second spiral trac, the predetermined rotational speed being such that the continuum of individual holograms are reconstructed and detected at a rate which is compatible with the television receiver so that a complete image is formed by the television receiver in its conventional manner.

27. A holographic video disc playback system according to claim 26, wherein the photodetecting array is a charge coupled device.

28. A holographic video disc playback system according to claim 26, wherein the photodetecting array is a charge injection device.

29. A holographic video disc playback system according to claim 26, wherein the beam of coherent light is derived from a laser.

30. A holographic video disc playback system according to claim 29, wherein the laser is a He-Ne laser.

31. A holographic video disc playback system according to claim 29, wherein the means for detecting also includes means for synchronizing the rotational speed of the turntable so that the rate of reconstruction of successive individual holograms coincides with a conventional television horizontal line rate.

32. A holographic video disc playback system according to claim 31, wherein the predetermined rotational speed is variable and is inversely proportional to the radius of the record medium at the location of an individual hologram being reconstructed, the individual holograms being recorded on the record medium at regularly spaced intervals along the length of the second spiral track.

33. A holographic video disc playback system according to claim 31, wherein the predetermined rotational speed is essentially constant, there being an essentially equal number of individual holograms being reconstructed during each revolution of the video disc and turntable.

34. A holographic video disc playback system according to claim 31, wherein the predetermined rotational speed is less than 40 revolutions per minute.

35. a holographic video disc playback system according to claim 31, wherein the grooved spiral guiding track is modulated with information and the depending stylus is affixed to a transducer for retrieving the information, the information being different from and related to the information in the second spiral track of holograms.

36. A method for retrieving information from a holographic video disc, the holographic video disc including a recording medium having a pair of generally planar parallel surfaces thereon and a means for indexing a center position on the record medium so that the center positions can be made coincident, a first spatial guiding track formed in a surface of the record medium commencing at an outward position and continuing inwardly at a predetermined rate per revolution of the record medium, and a second spiral track formed in a surface of the record medium in an essentially constant spatial relationship to the first spiral guiding track, the second spiral track being comprised of a continuum of individual holograms, each successive hologram in the second spiral track being a hologram of a one-dimensional line image containing baseband video information for one successive horizontal television line interval, and each individual hologram being representative of an interference pattern formed by the intersection of a data beam and stationary reference beam, at least one of the beams having the baseband video information for the successive horizontal television line interval modulated thereon, both beams being focussed at an image plane lying optically beyond and parallel to the planar surfaces of the record medium, the method comprising the steps of duplicating a selected one of the data beam and the reference beam at the hologram thereby reconstructing the other one of the data beam and the reconstruction beam utilized to form the individual hologram, the reconstructed one of the data beam and reference beam being focussed at the image plane and containing the baseband video information for the one successive horizontal television line interval, sensing the first spiral guiding track formed in a surface of the record medium, maintaining the reconstruction beam of light in a stable relationship to the second spiral track, rotating the video disc at a predetermined rotational speed, the predetermined rotational speed being such that the plurality of individual holograms are reconstructed and detected at a rate which is compatible with a television receiver, integrally detecting the baseband video information for the successive horizontal television line interval, and generating a baseband video electrical signal of the detected baseband video information, which signal may be supplied to the television receiver, whereby a complete image is formed by the television receiver in the conventional manner.

37. A method for retrieving information from a holographic video disc according to claim 36, wherein the first spiral guiding track is grooved and is modulated with information and wherein there is further included the step of retrieving the information, the information being different from and related to the information in the second spiral track of holograms.

38. A method for retrieving information from a holographic video disc according to claim 36, wherein there is further included the step of synchronizing the rotational speed of the turntable so that the rate of reconstruction of successive individual holograms coincides with a conventional television horizontal line rate.

39. A method for retrieving information from a holographic video disc according to claim 38, wherein the predetermined rotational speed is variable and is inversely proportional to the radius of the record medium at the location of an individual hologram being reconstructed, the individual holograms being recorded on the record medium at regularly spaced intervals along the length of the second spiral track.

40. A method for retrieving information from a holographic video disc according to claim 38, wherein the predetermined rotational speed is essentially constant, there being an essentially equal number of individual holograms being reconstructed during each revolution of the video disc and turntable.

41. A method for retrieving information from a holographic video disc according to claim 38, wherein the reference beam at formation is duplicated thereby reconstructing the data beam at formation, the data beam at formation having been distributed through a preselected angle at the intersection, the baseband video information for the one successive horizontal television line being sequentially distributed through the preselected angle so that the reconstructed data beam is a continuum of data beam components which are focussed essentially to a line in the image plane.

42. A method for retrieving information from a holographic video disc according to claim 38, wherein there is further included the step of scanning the reconstruction beam of light through a preselected angle to duplicate a continuum of the data beam components at formation, the baseband video information for one successive horizontal television line being sequentially distributed through the preselected angle, a stationary reference beam being thereby reconstructed which is focussed to a point in the image plane.

* * * * *